(12) United States Patent
Hirotsu et al.

(10) Patent No.: US 9,160,490 B2
(45) Date of Patent: Oct. 13, 2015

(54) ELECTRONIC CONTROL DEVICE

(71) Applicant: Hitachi Automotive Systems, Ltd., Hitachinaka-shi, Ibaraki (JP)

(72) Inventors: Teppei Hirotsu, Tokyo (JP); Nobuyasu Kanekawa, Tokyo (JP); Takuya Mayuzumi, Hitachinaka (JP); Tsutomu Yamada, Tokyo (JP); Chihiro Sato, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/376,304

(22) PCT Filed: Feb. 1, 2013

(86) PCT No.: PCT/JP2013/052305
§ 371 (c)(1),
(2) Date: Aug. 1, 2014

(87) PCT Pub. No.: WO2013/145852
PCT Pub. Date: Oct. 3, 2013

(65) Prior Publication Data
US 2014/0362933 A1 Dec. 11, 2014

(30) Foreign Application Priority Data
Mar. 30, 2012 (JP) ................. 2012-078804

(51) Int. Cl.
*H04B 3/00* (2006.01)
*H04L 1/00* (2006.01)
*F02D 41/20* (2006.01)
*F02D 41/26* (2006.01)
*G08C 19/16* (2006.01)

(52) U.S. Cl.
CPC .............. *H04L 1/0047* (2013.01); *F02D 41/20* (2013.01); *F02D 41/266* (2013.01); *G08C 19/16* (2013.01); *H04L 1/0042* (2013.01)

(58) Field of Classification Search
CPC ..... H04L 1/0047; H04L 1/0042; G08C 19/16
USPC ................................................ 375/257; 701/1
See application file for complete search history.

(56) References Cited

U.S. PATENT DOCUMENTS

| | | | | |
|---|---|---|---|---|
| 4,933,862 A | * | 6/1990 | Wataya | 701/105 |
| 4,989,150 A | * | 1/1991 | Tazawa | 701/101 |
| 5,263,450 A | * | 11/1993 | Hashimoto et al. | 123/406.62 |
| 6,845,315 B2 | * | 1/2005 | Hashimoto et al. | 701/114 |
| 2002/0029098 A1 | * | 3/2002 | Sakurai et al. | 701/1 |

(Continued)

FOREIGN PATENT DOCUMENTS

| | | |
|---|---|---|
| JP | 08-284729 A | 10/1996 |
| JP | 08284729 A2 * | 10/1996 |
| JP | 10-177504 A | 6/1998 |

(Continued)

*Primary Examiner* — Juan A Torres
(74) *Attorney, Agent, or Firm* — Volpe and Koenig, P.C.

(57) ABSTRACT

By reducing the serial transmission amount of pulses between a driving IC and a control IC, the transmission times of various commands other than the transmission time of the pulses can be secured, so that the improvement of reliability and high performance of the entirety of an electronic control device can be realized. The serial transmission between the driving IC and the control IC is started at the time when the edges of the pulses are detected.

8 Claims, 11 Drawing Sheets

(56) References Cited

U.S. PATENT DOCUMENTS

2002/0114409 A1* 8/2002 Shingaki .................. 375/340
2004/0230347 A1* 11/2004 Sakurai et al. ............... 701/1

FOREIGN PATENT DOCUMENTS

| JP | 2004-339977 A | 12/2004 |
| JP | 2011-174397 A | 9/2011 |

* cited by examiner

| SELECTION RESULT | OUTPUT(DATA1) | |
|---|---|---|
| | TAG | DATA |
| req3 | 0 | P1[15:8] |
| req2 | 10 | P1[7:4] |
| req1 | 11 | P1[3:0] |

FIG.8

| INPUT | OUTPUT |
|---|---|
| 10000000 | 111 |
| 01000000 | 110 |
| 00100000 | 101 |
| 00010000 | 100 |
| 00001000 | 011 |
| 00000100 | 010 |
| 00000010 | 001 |
| 00000001 | 000 |

FIG.9

| ADJUSTMENT RESULT | OUTPUT(DATA1) | |
|---|---|---|
| | TAG | DATA |
| req3r | 01 | E2r[2:0] |
| req3f | 00 | E2f[2:0] |
| req2 | 101 | P1[7:4] |
| req1 | 100 | P1[3:0] |

FIG.13

| ADJUSTMENT RESULT | OUTPUT(DATA1) | |
|---|---|---|
| | TAG | DATA |
| req3r | 01 | E2r[2:0] |
| req3f | 00 | P1[15:8] |
| req2 | 101 | P1[7:4] |
| req1 | 100 | P1[3:0] |

ELECTRONIC CONTROL DEVICE

TECHNICAL FIELD

The present invention relates to electronic control devices, and more particularly, to an electronic control device that is suitable for use in an apparatus including an IC that drives loads and an IC that generates a pulse used for driving the loads.

BACKGROUND ART

As various control targets have been electronically controlled, electric actuators such as an injector, an igniter, a motor, a solenoid, and a relay have been widely used. As disclosed in Patent Literature 1, for example, an electronic control device for controlling these actuators generally includes two kinds of ICs: one is a driving IC that drives the actuators (loads), and the other is a control IC that generates pulses for driving the loads.

In recent years, along with the advance of performance of the electronic control devices, it has become possible for one driving IC to drive many loads. In this case, there arises a problem in that, because the number of signals transmitted between the driving IC and the control IC increases, it becomes necessary that a package with a large number of pins should be employed for each IC and the wiring area of board for mounting each IC should be wide, with the result that the cost and size of the electronic control device increase. In order to address this problem, measures to reduce the number of signals transmitted between the driving IC and the control IC are taken using the micro second bus (MSB) that is a communication protocol used for serially transmitting plural pulse signals between the driving IC and the control IC.

CITATION LIST

Patent Literature

Patent Literature 1: Japanese Unexamined Patent Application Publication No. 2004-339977

SUMMARY OF INVENTION

Technical Problem

In pulse serial transmission using the MSB, it is necessary that a serial transmission cycle should be shortened in order to improve the time resolution of pulse for highly accurate control. In this case, because time intervals between transmitted pulses are short, and it is impossible to send commands used for fault diagnosis of IC2 or for controlling various functions, for example, during the time intervals, there arises a problem in that the reliability of the entirety of an electronic control device is lowered or functions inherent to IC2 are restricted.

In addition, as the number of pulses to be transmitted increases, it takes time all the more to serially transmit the pulses, and mismatches between pulses generated by the control IC and timings at which the driving IC drives loads occur, which causes a problem in that it becomes impossible to execute a highly accurate control.

A first object of the present invention is to reduce the serial transmission amount of pulses between the driving IC and the control IC.

A second object of the present invention is to provide a means to secure strict timings among pulses even if the number of pulses increases in the serial transmission of pulses between the driving IC and the control IC.

Solution to Problem

In order to achieve the above objects, an electronic control device according to the present invention is characterized in that the electronic control device includes: a first electronic circuit containing plural transistors for driving currents that flow through loads; and a second electronic circuit containing a pulse generation circuit for generating plural pulses that are input into the transistors. In addition, in the electronic control device that transmits the pulses to the first electronic circuit using serial communication, the second electronic circuit contains an edge detection circuit for detecting the edges of the pulses, and the transmission of the pulses is executed when the edge detection circuit detects at least one edge out of the edges of the pulses.

Advantageous Effects of Invention

According to the present invention, strict timings among pulses can be secured even if the number of pulses increases in the serial transmission of pulses between the driving IC and the control IC.

BRIEF DESCRIPTION OF EMBODIMENTS

FIG. 8 is an encode table for edge signals.

FIG. 9 is the data configuration of DATA1 output by an adjustment circuit (77).

FIG. 13 is the data configuration of DATA1 output by an adjustment circuit (121).

DESCRIPTION OF EMBODIMENTS

Figure 1:
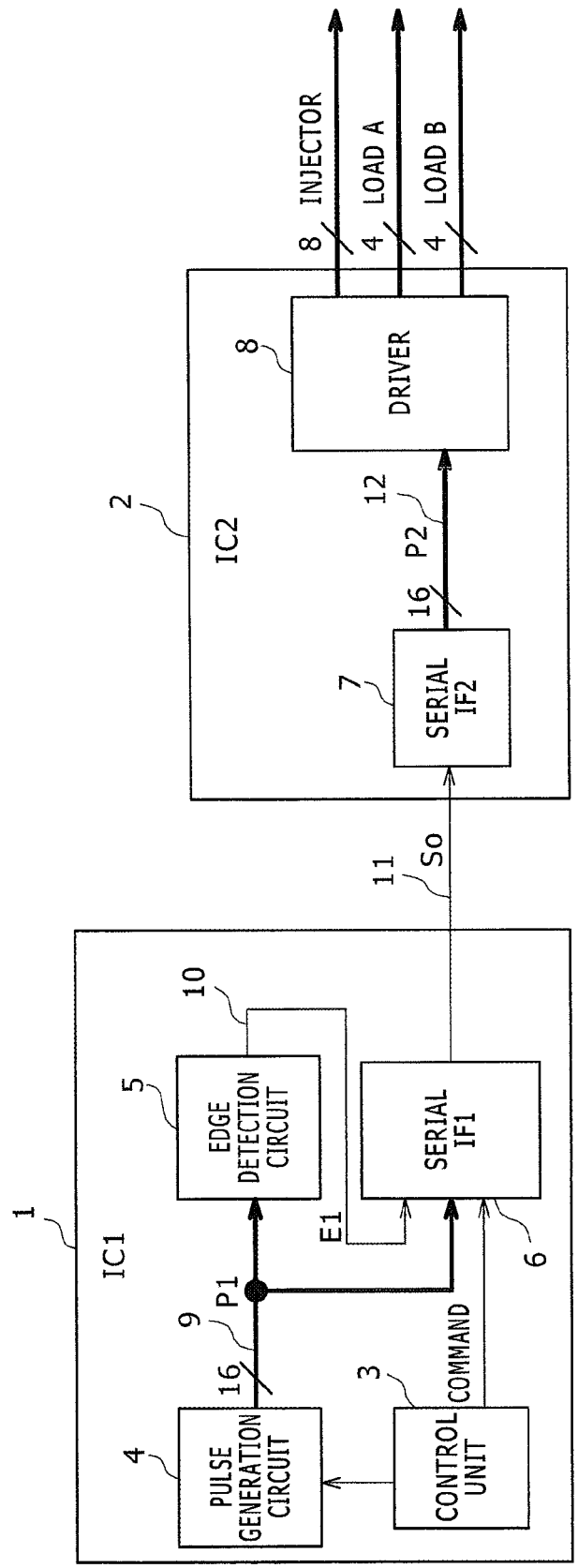
FIG. 1 is a block diagram showing the configuration of a current control device according to a first embodiment of the present invention.

Hereinafter, the configuration and behavior of a current control device according to a first embodiment of the present invention will be described with reference to FIG. 1 and FIG. 2.

First Embodiment

First, the configuration of an electronic control device according to this embodiment will be described with reference to FIG. 1. FIG. 1 is a block diagram showing the configuration of the electronic control device according to the first embodiment of the present invention.

The electronic control device includes IC2 (2) that drives loads and IC1 (1) that generates pulses used for indicating timings at which IC2 (2) drives the loads, and IC1 (1) and IC2 (2) are coupled to each other via a serial communication line So (11). The electronic control device according to this embodiment drives, for example, eight injectors 1 t0 8 that inject fuel into an in-vehicle multicylinder engine, and other four loads A1 to A4 and four loads B1 to B4, but loads to be driven by the electronic control device are not limited to these loads, and any load can be driven by the electronic control device as long as it is driven by a pulse.

IC1 (1) mainly includes a various digital circuits such as a pulse generation circuit (4) that generates pulses; a control unit (3) that generates a pulse width and instructions about pulse timings, and various commands about IC diagnosis and the like; an edge detection circuit (5) for detecting the edges of pulses; and serial IF1 (6) used for communication with IC2 (2) via the serial communication line So (11).

The control unit (3) calculates the pulse width, and the instructions about pulse timings using inputs from various sensors such as an intake air flow sensor for detecting intake, air flows into an engine (not shown in this embodiment) on the basis of a control algorithm such as fuel injection quantity calculation, and sends the pulse widths and instructions about pulse timings to the pulse generation circuit (4). In addition, the control unit (3) generates various commands as needed for the fault diagnosis of IC2 (2), configuration changes, and the like, and sends the commands to serial IF1 (6).

The pulse generation circuit (4) generates, for example, a 16-bit pulse in accordance with the pulse width and the instructions about pulse timings sent from the control unit (3). This pulse is transmitted to the edge circuit (5) and serial IF1 (6) via a 16-bit signal line P1 (9). Here, a 16-bit pulse according to this embodiment respectively correspond to eight injectors 1 to 8, four loads A1 to A4, and four loads B1 to B4 in order of bits from the highest bit to the lowest bit.

The edge detection circuit (5) detects the rising edge or falling edge of each bit of a 16-bit pulse sent from the pulse generation circuit (4), and sends the timing at which the edge is detected to serial IF1 (6) via an edge detection signal E1 (10).

On receiving the timing sent from the edge detection circuit (5), serial IF1 (6) serially converts the 16-bit pulse sent from the pulse generation circuit (4), and sends the serially converted pulses to IC2 (2) via the serial communication line So (11). In addition, serial IF1 (6) sends a command sent from the control unit (3) during a vacant time of serial transmission of the pulse in which serial IF1 (6) does not receive the edge detection.

IC2 (2) includes serial IF2 (7) used for communication with IC1 (1) via the serial communication line So (11), and a driver (8) for driving loads.

Serial IF2 (7) converts the serial data of the 16-bit pulse sent from IC1 (1) into parallel data, and sends the 16-bit pulse to the driver (8) via a signal line P2 (12). In addition, serial IF2 (7) receives commands sent from IC1 (1), and executes the fault diagnosis of IC2 (2) and the control of various functions, where the fault diagnosis and the control are not shown diagrammatically in this embodiment.

The behavior of serial transmission of a 16-bit pulse from IC1 (1) to IC2 (2) will be described with reference to FIG. 2.

Figure 2:
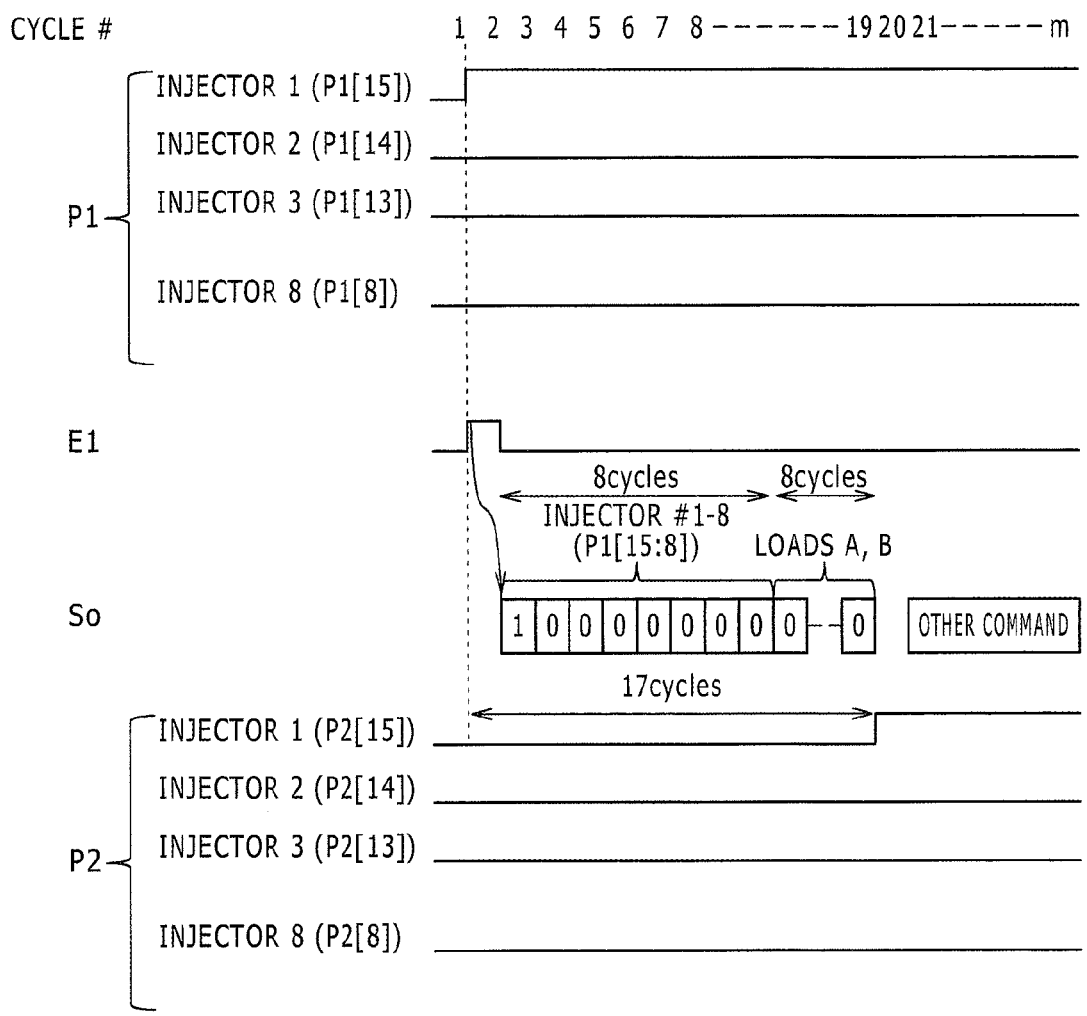
FIG. 2 is a timing chart of serial transmission of a 16-bit pulse from IC1 (1) to IC2 (2) according to the first embodiment of the present invention.

FIG. 2 is a timing chart of serial transmission of a 16-bit pulse from IC1 (1) to IC2 (2).

This timing chart is a diagram showing an example of serial transmission of a 16-bit pulse at the time when a pulse for driving an injector 1 among eight injectors 1 to 8, four loads A1 to A4, and four loads B1 to B4 changes from "0" to "1".

First, at cycle 2, pulse P1 [15] for driving the injector 1 changes from "0" to "1". The edge detection circuit (5) detects the rising edge of P1 [15], and outputs "1" to the edge detection signal E1 (10).

Subsequently, at cycle 3, on being informed of the edge detection from the edge detection circuit (5), serial IF1 (6) starts the serial transmission of the 16-bit pulse output from the pulse generation circuit (4). It takes 16 cycles to serially transmit the 16-bit pulse, so that the transmission of the last bit is finished at cycle 19.

At cycle 20, serial IF2 (7) converts the serial data of the received 16-bit pulse into parallel data, and outputs "1" to the P2 [15].

As described above, because the serial transmission is started at the time when an edge of a pulse is detected, if any pulse does not change during a time interval, the serial transmission of pulses does not occur during the time interval. With the use of these vacant cycles, various commands used for the fault diagnosis of IC2 (2) and for controlling various functions can be sent, and further pulses can be redundantly sent in order to improve resistance property against noise. Owing to the above-mentioned steps, the improvement of reliability and high performance of the entirety of the electronic control device can be realized.

Second Embodiment

Hereinafter, the configuration and behavior of a current control device according to a second embodiment of the present invention will be described with reference to FIG. 3 to FIG. 6.

First, the configuration of an electronic control device according to this embodiment will be described with reference to FIG. 3.

Figure 3:
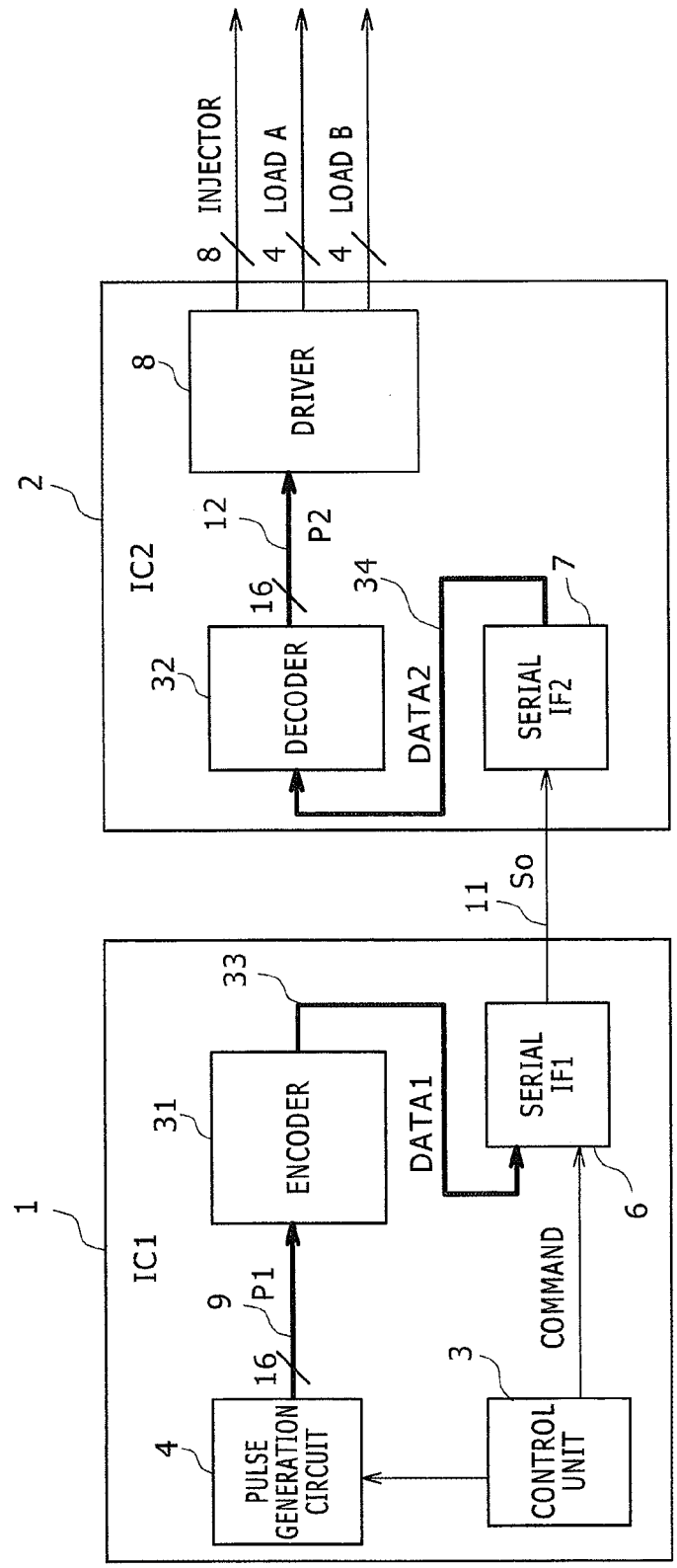
FIG. 3 is a block diagram showing the configuration of a current control device according to a second embodiment of the present invention.

FIG. 3 is a block diagram showing the configuration of the current control device according to the second embodiment. Here, the configuration of the electronic control device according to this embodiment is the same as that of the first embodiment except for an encoder (31) and a decoder (32), so that the detailed description of the same components will be omitted.

Figure 4:
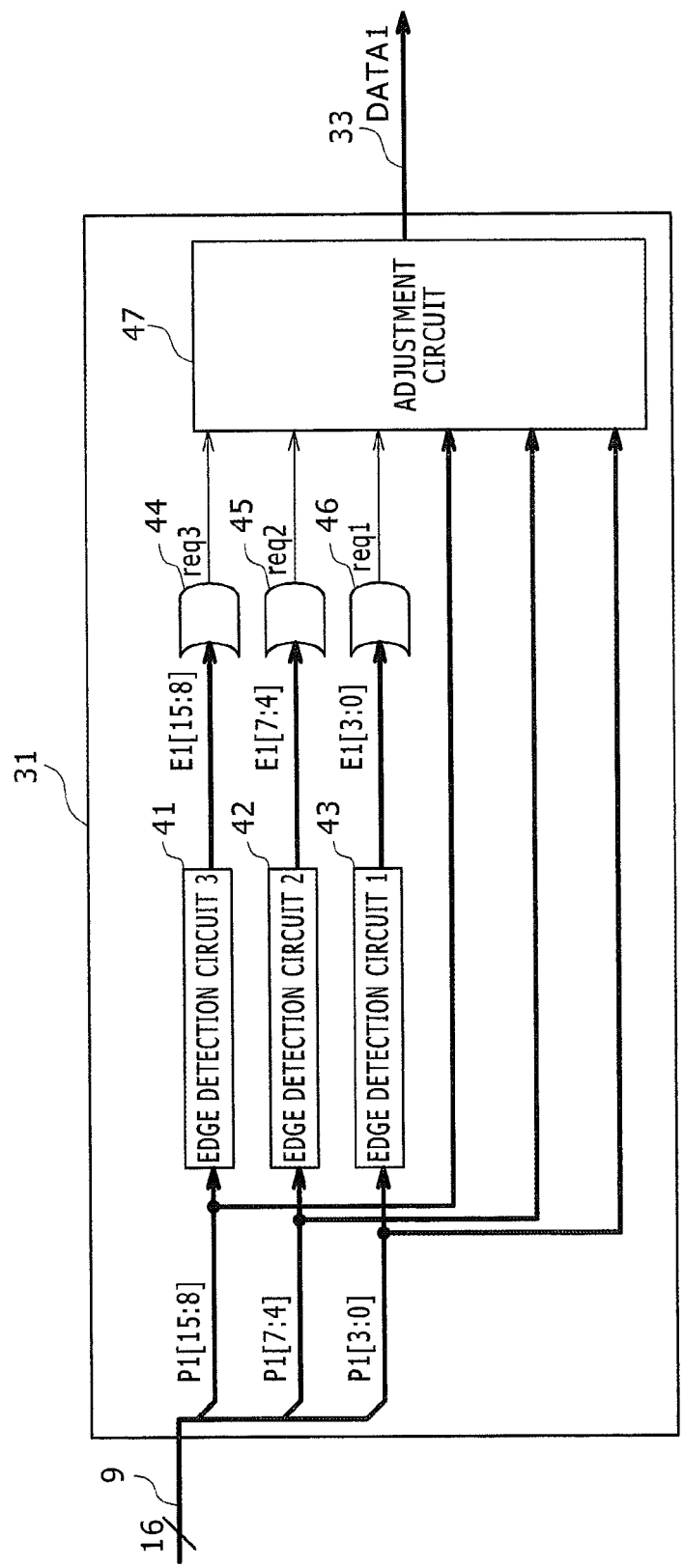
FIG. 4 is a block diagram showing the detailed configuration of an encoder (31) according to the second embodiment of the present invention.

The encoder (31) executes data conversion on a 16-bit pulse sent from a pulse generation circuit (4) with the use of a method that will be described later using FIG. 4 and FIG. 5, and sends obtained data to serial IF1 (6) via a signal line DATA1 (33).

On receiving valid data from the encoder (31), serial IF1 (6) serially converts the data, and sends the serially converted data to IC2 (2) via a serial communication line So (11). In addition, serial IF1 (6) sends various commands sent from a control unit (3) to IC2 (2) during a vacant time of serial transmission of the pulse.

Serial IF2 (7) converts the serial data sent from IC1 (1) into parallel data, and sends the parallel data to the decoder (32) via a DATA2 (34). In addition, serial IF2 (7) receives commands sent from IC1 (1), and executes the fault diagnosis of IC2 (2) and the control of various functions, where the fault diagnosis and the control are not shown diagrammatically in this embodiment.

The decoder (32) recovers the 16-bit pulse by executing data conversion that is the inverse of the conversion executed by the encoder (31) on the data sent from serial IF2 (7), and sends the recovered pulse to a driver (8) via a signal line P2 (12).

Next, the detailed configuration of the encoder (31) will be described with reference to FIG. 4. FIG. 4 is a block diagram showing the detailed configuration of an encoder (31).

The encoder (31) includes: an edge detection circuit 1 (43); an edge detection circuit 2 (42); an edge detection circuit 3 (41); an OR gate 1 (46); an OR gate 2 (45); an OR gate 3 (44); and an adjustment circuit (47).

The edge detection circuit 1 (43) detects the rising edge or falling edge of each of #0 bit to #3 bit of the 16-bit pulse sent from the pulse generation circuit (4), and outputs the edge detection result of each bit to the corresponding bit of an edge detection signal E1 [3:0]. The OR gate 1 (46) performs logical addition of the edge detection signal E1 [3:0], and outputs the result to req1. It can be understood from the above configuration that, if req1 is "1", any one of #0 bit to #3 bit of the 16-bit pulse sent from the pulse generation circuit (4) has a rising edge or a falling edge, and the transmission request of #0 bit to #3 bit of the 16-bit pulse is generated.

The edge detection circuit 2 (42) detects the rising edge or falling edge of each of #4 bit to #7 bit of the 16-bit pulse sent from the pulse generation circuit (4), and outputs the detection result of each bit to the corresponding bit of an edge output signal E1 [7:4]. The OR gate 2 (45) performs logical addition of the edge detection signal E1 [7:4], and outputs the result to req2. It can be understood from the above configuration that, if req2 is "1", any one of #4 bit to #7 bit of the 16-bit pulse sent from the pulse generation circuit (4) has a rising edge or a falling edge, and the transmission request of pulses of #4 bit to #7 bit of the 16-bit pulse is generated.

The edge detection circuit 3 (41) detects the rising edge or falling edge of each of #8 bit to #15 bit of the 16-bit pulse sent from the pulse generation circuit (4), and outputs the detection result of each bit to the corresponding bit of an edge output signal E1 [15:8]. The OR gate 3 (44) performs logical addition of the edge detection signal E1 [15:8], and outputs the result to req3. It can be understood from the above configuration that, if req3 is "1", any one of #8 bit to #15 bit of the 16-bit pulse sent from the pulse generation circuit (4) has a rising edge or a falling edge, and the transmission request of #8 bit to #15 bit of the 16-bit pulse is generated.

The adjustment circuit (47) outputs DATA1 in accordance with the transmission request of each pulse of req1, req2, and req3. Here, if the transmission requests of req1, req2, and req3 compete against each other, the transmission requests are selected on the basis of their priorities. For example, the priority of req3 is higher than that of req2, and the priority of req2 is higher than that of req1. In addition, owing to the competition among the transmission requests, requests that are not selected are stored in a buffer, and each of the requests is accepted after the precedently selected transmission is finished.

Figures 5, 6:
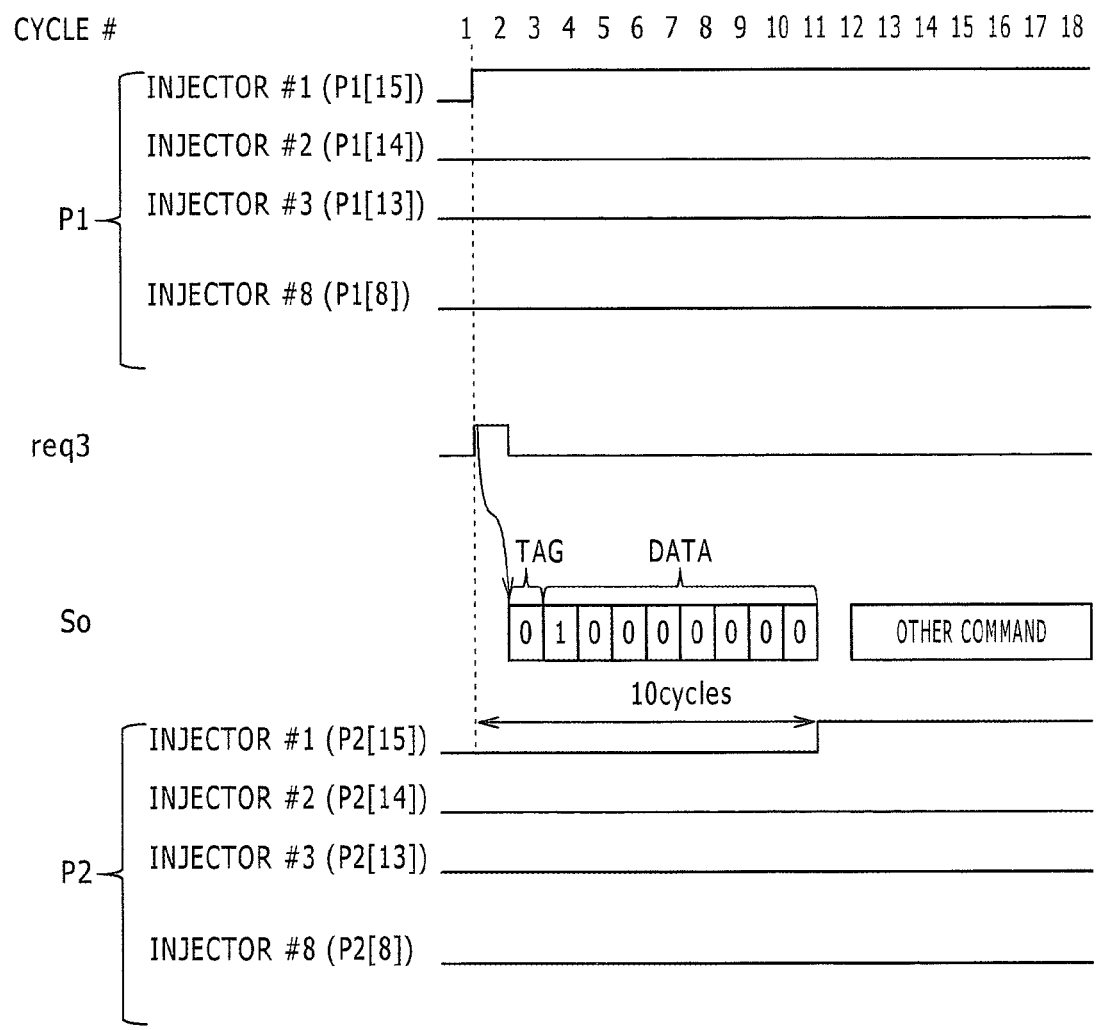
FIG. 5 is the data configuration of DATA1 output by an adjustment circuit (47).
FIG. 6 is a timing chart of serial transmission of a 16-bit pulse from IC1 (1) to IC2 (2) according to the second embodiment of the present invention.

FIG. 5 shows the data configuration of DATA1 output by the adjustment circuit (47). DATA1 includes TAG field and DATA field, and TAG="0" and DATA=P1 [15:8] when req3 is selected, TAG="10" and DATA=P1 [7:4] when req2 is selected, and TAG="11" and DATA=P1 [3:0] when req1 is selected.

Next, a behavior in which a 16-bit pulse is serially transmitted from IC1 (1) to IC2 (2) will be described with reference to FIG. 6.

FIG. 6 is a timing chart of serial transmission of a 16-bit pulse from IC1 (1) to IC2 (2).

This timing chart shows an example of serial transmission of a 16-bit pulse in which a pulse that drives an injector 1 among eight injectors 1 to 8, four Loads A1 10 A4m four loads B1 to B4 changes from "0" to "1".

First, at cycle 2, a pulse P1 [15] that drives the injector 1 changes from "0" to "1". The edge detection circuit 3 (42) detects the rising edge of the P1 [15], and outputs "1" to req3 that is the transmission request of #8 bit to #15 bit of the 16-bit pulse via the OR gate 3 (44). The adjustment circuit (47) outputs DATA1 comprised of TAG (="0"), and DATA (=P1 [15:8]) as explained in FIG. 5.

Next, at cycle 3, serial IF1 (6) receives valid data output from the adjustment circuit (47), and starts the serial transmission of DATA1 output by the adjustment circuit (47). While it takes 16 cycles to transmit the 16-bit pulse according to the first embodiment, because pulse data serially transmitted in this case are only #8 bit to #15 bit including P1 [15] necessary to be transmitted out of the 16-bit pulse, it takes 9 cycles to transmit #8 bit to #15 bit, and the transmission of the last bit is finished at cycle 11.

Subsequently, at cycle 12, data received via serial IF2 (7) is decoded by the encoder (31), and "1" is output to P2 [15].

As described above, because a combination of pulses including bits necessary to be transmitted is selected out of a 16-bit pulse and serially transmitted, a delay that occurs during the serial transmission of the pulses is shortened, which enables the strict timings of pulses to be secured. In addition, during a vacant time of serial transmission in which there are no transmission requests, various commands used for the fault diagnosis of IC2 (2) and for controlling various functions can be sent, and further pulses can be redundantly sent in order to improve resistance property against noise. Owing to the above-mentioned steps, in the serial transmission between the driving IC and the control IC, the transmission time of various commands other than the transmission time of pulses can be secured, so that the improvement of reliability and high performance of the entirety of the electronic control device can be realized.

Third Embodiment

Hereinafter, the configuration and behavior of a current control device according to a third embodiment of the present invention will be described with reference to FIG. 7 to FIG. 10. Here, the configuration of the current control device according to the third embodiment is the same as that of the second embodiment except for the internal configurations of an encoder (31) and a decoder (32), so that the detailed description of the same components will be omitted.

First, the detailed configuration of the encoder (31) will be described with reference to FIG. 7.

Figure 7:
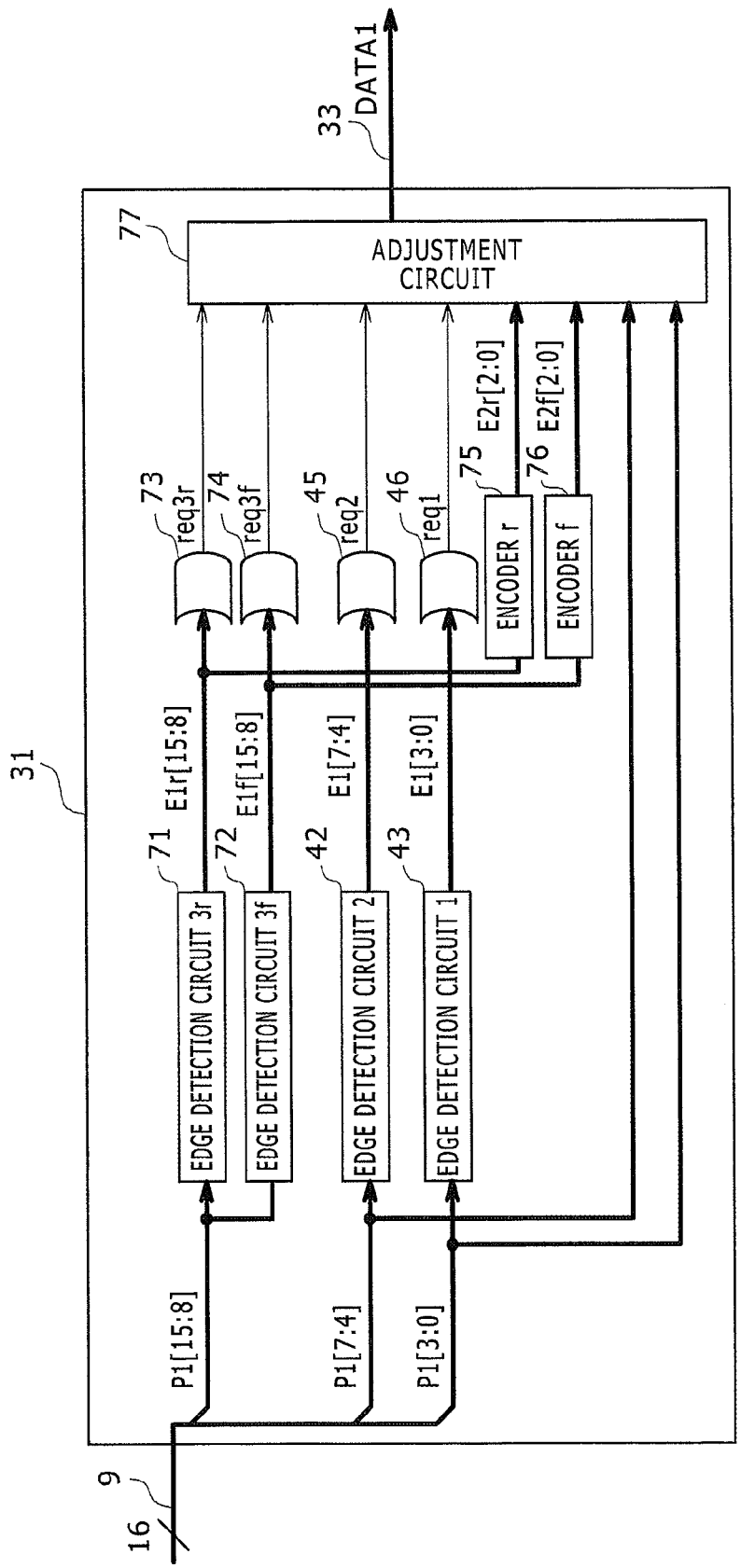
FIG. 7 is a block diagram showing the detailed configuration of an encoder (31) according to the third embodiment of the present invention.

FIG. 7 is a block diagram showing the detailed configuration of the encoder (31).

The encoder (31) includes: an edge detection circuit 1 (43); an edge detection circuit 2 (42); an edge detection circuit 3f (72); an edge detection circuit 3r (71); an OR gate 1 (46); an OR gate 2 (45); an OR gate 3f (74); an OR gate 3r (73); an encoder f (76); an encoder r (75); and an adjustment circuit (77).

The edge detection circuit 1 (43) detects the rising edge or falling edge of each of #0 bit to #3 bit of the 16-bit pulse sent from a pulse generation circuit (4), and outputs the edge detection result of each bit to the corresponding bit of an edge output signal E1 [3:0]. The OR gate 1 (46) performs logical addition of the edge detection signal E1 [3:0], and outputs the result to req1. It can be understood from the above configuration that, if req1 is "1", any one of #0 bit to #3 bit of the 16-bit pulse sent from the pulse generation circuit (4) has a rising edge or a falling edge, and the transmission request of #0 bit to #3 bit of the 16-bit pulse is generated.

The edge detection circuit 2 (42) detects the rising edge or falling edge of each of #4 bit to #7 bit of the 16-bit pulse sent from the pulse generation circuit (4), and outputs the detection result of each bit to the corresponding bit of an edge output signal E1 [7:4]. The OR gate 2 (45) performs logical addition of the edge detection signal E1 [7:4], and outputs the result to req2. It can be understood from the above configuration that, if req2 is "1", any one of #4 bit to #7 bit of the 16-bit pulse sent from the pulse generation circuit (4) has a rising edge or a falling edge, and the transmission request of pulses of #4 bit to #7 bit of the 16-bit pulse is generated.

The edge detection circuit 3f (72) detects the falling edge of each of #8 bit to #15 bit of the 16-bit pulse sent from the pulse generation circuit (4), and outputs the detection result of each bit to the corresponding bit of an edge output signal E1f [15:8]. The OR gate 3f (74) performs logical addition of the edge detection signal E1f [15:8], and outputs the result to req3f. It can be understood from the above configuration that, if req3f is "1", any one of #8 bit to #15 bit of the 16-bit pulse sent from the pulse generation circuit (4) has a falling edge, and the transmission request of #8 bit to #15 bit of the 16-bit pulse is generated.

The edge detection circuit 3r (71) detects the rising edge of each of #8 bit to #15 bit of the 16-bit pulse sent from the pulse generation circuit (4), and outputs the detection result of each bit to the corresponding bit of an edge output signal E1r [15:8]. The OR gate 3r (73) performs logical addition of the edge detection signal E1r [15:8], and outputs the result to req3. It can be understood from the above configuration that, if req3 is "1", any one of #8 bit to #15 bit of the 16-bit pulse sent from the pulse generation circuit (4) has a rising edge, and the transmission request of #8 bit to #15 bit of the 16-bit pulse is generated.

The encoder f (76) encodes E1f [15:8], and outputs the result to E2f [2:0]. Here, E1f [15:8] shows the falling edges of pulses respectively corresponding to an injector 1 to an injector 8. These falling edges are generated in rotation at timings every eighth of a time period during which the multicylinder engine having the eight injectors 1 to 8 rotates 360 degrees, and do not overlap each other. With the use of this feature, for example as shown in an input/output table in FIG. 8, 8-bit E1f [15:8] is encoded, so that 8-bit E1f [15:8] can be compressed to 3-bit data. The encoder r (75) encodes E1r [15:8], and outputs the result to E2r [2:0]. Here, E1r [15:8] shows the rising edges of pulses respectively corresponding to the injector 1 to the injector 8, and these rising edges are generated in rotation at timings every eighth of a time period during which the multicylinder engine having the eight injectors 1 to 8 rotates 360 degrees, and do not overlap each other. With the use of this feature, for example as shown in the input/output table in FIG. 8, 8-bit E1f [15:8] is encoded, so that 8-bit E1f [15:8] can be compressed to 3-bit data.

In this embodiment, a plurality of pulses included in the same group are given numbers, the number of a pulse, which generates an edge, is encoded into a binary number in accordance with the input/output table in FIG. 8, and the decoded data is transmitted.

In the case of loads that behave in synchronization with multicylinder engine such as igniters that ignites air-fuel mixture, with the use of driving pulses on the precondition that the edges of the driving pulses do not overlap each other, the number of bits to be transmitted can be compressed in a similar way as above.

In other words, in this embodiment, the pulses P1 [15:8], whose edges are guaranteed not to overlap each other by the system are classified into one group, and P1 [3:0] and P1 [7:4] whose edges are not guaranteed not to overlap each other by the system are classified into other groups. Owing to the above-mentioned steps, in the group to which the pulses P1 [15:8] belong, because the combination patterns of outputs that individual pulses generate are limited, the number of bits to be transmitted can be compressed.

The adjustment circuit (77) outputs DATA1 in accordance with the transmission request of each pulse of req1, req2, req3f, and req3r. Here, if the transmission requests of req1, req2, req3f, and req3r compete against each other, the transmission requests are selected on the basis of their priorities. For example, the priority of req3r is higher than that of req3f, the priority of req3f is higher than that of req2, and the priority of req2 is higher than that of req1. In addition, owing to the competition among the transmission requests, requests that are not selected are stored in a buffer, and each of the requests is accepted after the precedently selected transmission is finished.

FIG. 9 shows the data configuration of DATA1 output by the adjustment circuit (77). DATA1 includes TAG field and DATA field, and TAG="01" and DATA=E2r [2:0] when req3r is selected, TAG="00" and DATA=E2f [2:0] when req3f is selected, TAG="101" and DATA=P1 [7:4] when req2 is selected, and TAG="100" and DATA=P1 [3:0] when req1 is selected.

Next, a behavior in which a 16-bit pulse is serially transmitted from IC1 (1) to IC2 (2) will be described with reference to FIG. 10.

Figure 10:
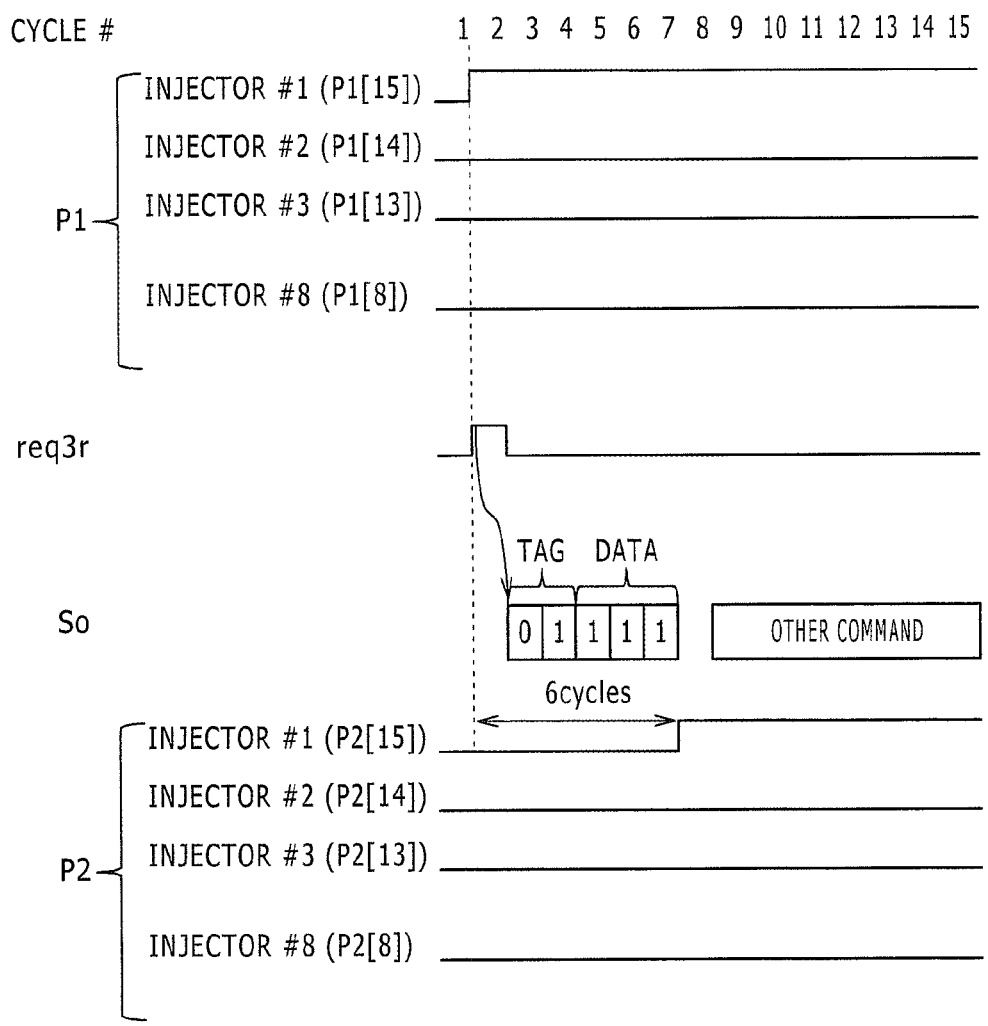
FIG. 10 is a timing chart of serial transmission of a 16-bit pulse from IC1 (1) to IC2 (2) according to the third embodiment of the present invention.

FIG. 10 is a timing chart of serial transmission of a 16-bit pulse from IC1 (1) to IC2 (2).

This timing chart shows an example of serial transmission of a 16-bit pulse in which a pulse that drives an injector 1 among eight injectors 1 to 8, four Loads A1 10 A4m four loads B1 to B4 changes from "0" to "1".

First, at cycle 2, a pulse P1 [15] that drives the injector 1 changes from "0" to "1". The edge detection circuit 3r (71) detects the rising edge of the P1 [15], and outputs "1" to req3 that is the transmission request of #8 bit to #15 bit of the 16-bit pulse via the OR gate 3 (44). At the same time, the encoder r (75) encodes E1r [15:8], and outputs the result to E2r [2:0]. The adjustment circuit (77) outputs DATA1 comprised of TAG (="01"), and DATA (=E2r [2:0]) as explained in FIG. 9.

Next, at cycle 3, serial IF1 (6) receives valid data output from the adjustment circuit (47), and starts the serial transmission of DATA1 output by the adjustment circuit (47). While it takes 9 cycles to transmit the pulse data according to the second embodiment, because pulse data serially transmitted in this case are 3-bit data, which is obtained by compressing #8 bit to #15 bit including P1 [15] necessary to be transmitted out of the 16-bit pulse, it takes a shorter time, that is, 6 cycles to transmit the 3-bit data, and the transmission of the last bit is finished at cycle 7.

Subsequently, at cycle 8, data received via serial IF2 (7) is decoded by the encoder (31), and "1" is output to P2 [15].

As described above, in this embodiment, because a combination of pulses including a bit to be transmitted is selected out of a 16-bit pulse and serially transmitted after being data compressed, a delay that occurs during the serial transmission of the pulses is shortened, which enables the strict timings of pulses to be secured.

Fourth Embodiment

Figure 11:
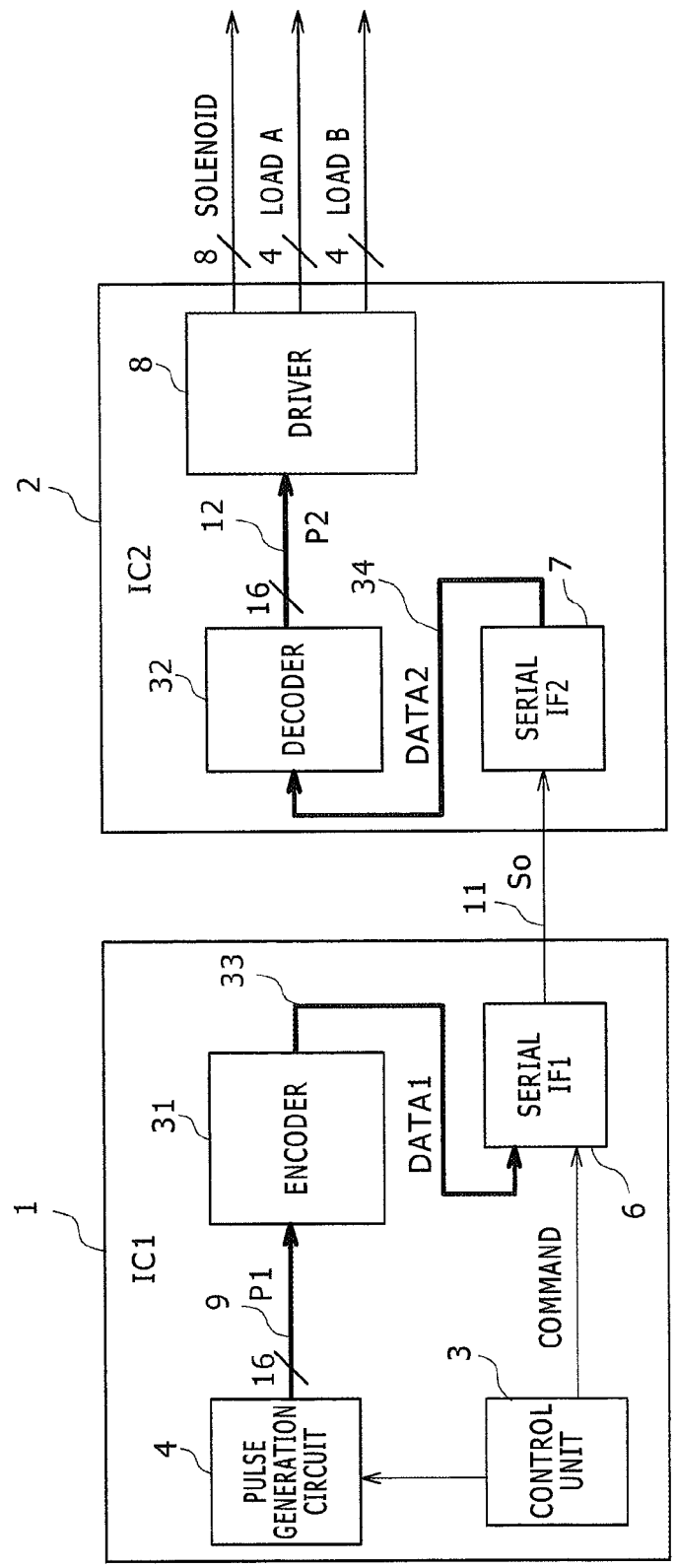
FIG. 11 is a block diagram showing the configuration of a current control device according to a fourth embodiment of the present invention.

Hereinafter, the configuration and behavior of a current control device according to a fourth embodiment of the present invention will be described with reference to FIG. 11 to FIG. 13. Here, the configuration of the current control device according to the fourth embodiment is the same as that of the third embodiment except for the internal configurations of an encoder (31) and a decoder (32), so that the detailed description of the same components will be omitted.

First, the configuration of the electronic control device according to this embodiment will be described with reference to FIG. 11. The electronic control device according to this embodiment drives eight solenoids 1 to 8, four loads A1 to A4, and four loads B1 to B4. Here, a 16-bit pulse according to this embodiment respectively correspond to eight solenoids 1 to 8, four loads A1 to A4, and four loads B1 to B4 in order of bits from the highest bit to the lowest bit.

Next, the detailed configuration of the encoder (31) will be described with reference to FIG. 12.

Figure 12:
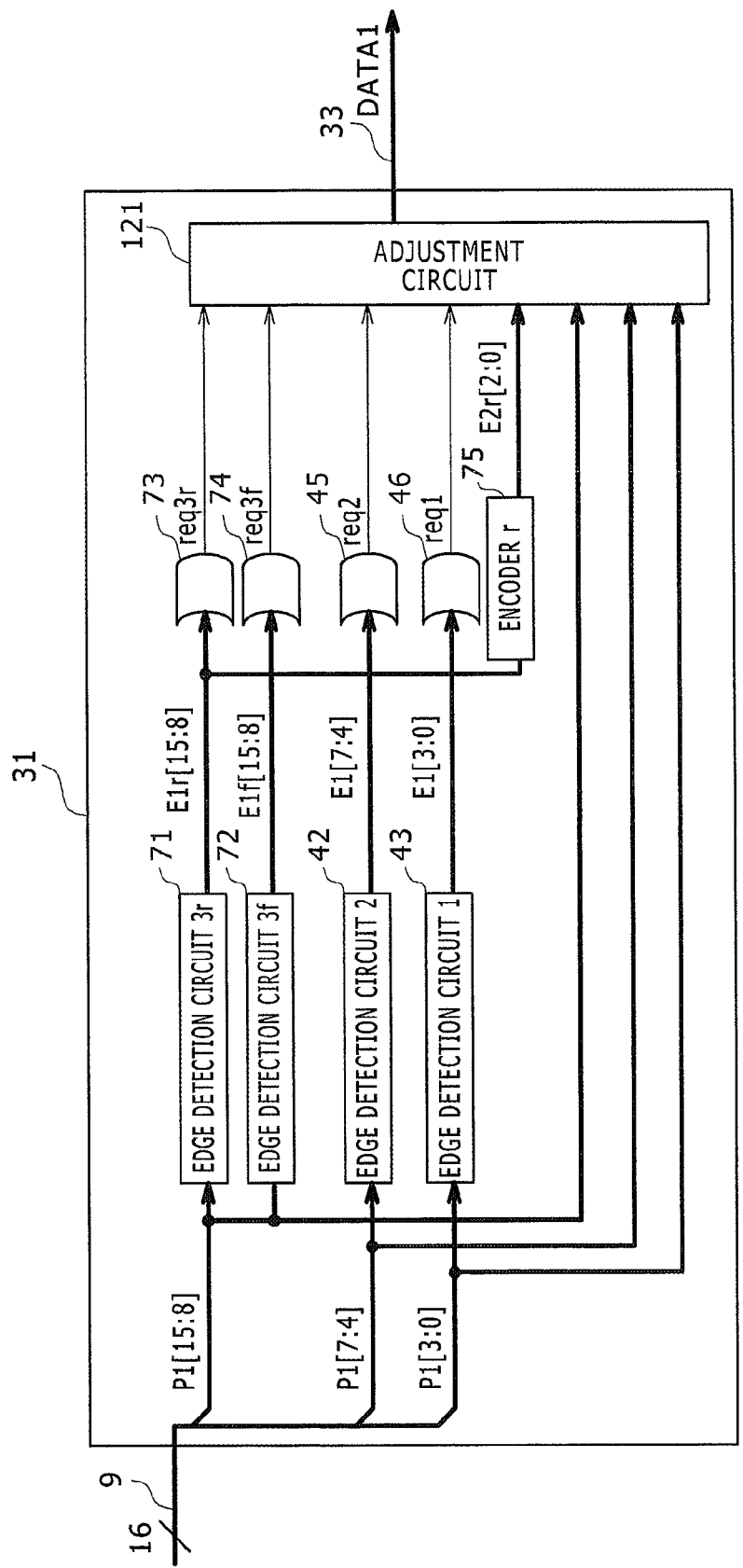
FIG. 12 is a block diagram showing the detailed configuration of an encoder (31) according to the fourth embodiment of the present invention.

FIG. 12 is a block diagram showing the detailed configuration of the encoder (31).

The encoder (31) includes: an edge detection circuit 1 (43); an edge detection circuit 2 (42); an edge detection circuit 3f (72); an edge detection circuit 3r (71); an OR gate 1 (46); an OR gate 2 (45); an OR gate 3f (74); an OR gate 3r (73); an encoder r (75); and an adjustment circuit (121). Here, the components of the encoder (31) according to this embodiment are the same as those of the third embodiment except for the adjustment circuit (121), so that the detailed description of the same components will be omitted.

The encoder r (75) encodes E1r [15:8], and outputs the result to E2r [2:0]. Here, E1r [15:8] shows the rising edges of pulses respectively corresponding to the solenoid 1 to the solenoid 8, and these rising edges are generally configured not to overlap each other in order to reduce noise. With the use of this feature, 8-bit E1r [15:8] can be compressed to 3-bit data according to the input/output table in FIG. 8.

The adjustment circuit (121) outputs DATA1 in accordance with the transmission request of each pulse of req1, req2, req3f, and req3r. Here, if the transmission requests of req1, req2, req3f, and req3r compete against each other, the transmission requests are selected on the basis of their priorities, where the priority of req3r is higher than that of req3f, the priority of req3f is higher than that of req2, and the priority of req2 is higher than that of req1. In addition, owing to the competition among the transmission requests, requests that are not selected are stored in a buffer, and each of the requests is accepted after the precedently selected transmission is finished.

FIG. 13 shows the data configuration of DATA1 output by the adjustment circuit (121). DATA1 includes TAG field and DATA field, and TAG="01" and DATA=E2r [2:0] when req3r is selected, TAG="00" and DATA=P1 [15:8] when req3f is selected, TAG="101" and DATA=P1 [7:4] when req2 is selected, and TAG=100 and DATA=P1 [3:0] when req1 is selected.

Here, the description of a behavior in which a 16-bit pulse is serially transmitted from IC1 (1) to IC2 (2) will be omitted because the behavior is the same as that of the third embodiment.

As described above, because a combination of pulses including a bit necessary to be transmitted is selected out of a 16-bit pulse and serially transmitted after being data compressed, a delay that occurs during the serial transmission of the pulses is shortened, which enables the strict timings of pulses to be secured.

LIST OF REFERENCE SIGNS

1 IC1
2 IC2
3 Control unit
4 Pulse generation circuit
5 Edge detection circuit
6 Serial IF1
7 Serial IF2
8 Driver

The invention claimed is:

1. An electronic control device comprising:
a first electronic circuit including a plurality of transistors for driving currents that flow through loads; and
a second electronic circuit including a pulse generating circuit for generating a plurality of pulses input into the transistors for indicating timing at which the first electronic circuit drives the loads,
wherein the second electronic circuit transmits the pulses to the first electronic circuit using serial communication,
wherein the second electronic circuit includes an edge detection circuit for detecting the edges of the pulses for indicating timing at which the first electronic circuit drives the loads, and
wherein the transmission of the pulses is executed when the edge detection circuit detects at least one edge out of the edges of the pulses.

2. The electronic control device according to claim 1,
wherein the pulses are classified into a plurality of groups; and
wherein a group including the pulse, the edge of which is detected by the edge detection circuit, is selected out of the pulses and transmitted.

3. The electronic control device according to claim 1,
wherein, when the edge detection circuit detects no edge out of the edges of the pulses, information for the diagnosis of the first electronic circuit; information used for things other than driving the transistors; or information that makes the pulses more redundant is transmitted.

4. The electronic control device according to claim 2,
wherein the classification is performed in such a way that pulses the edges of which do not occur at the same time are classified in the same group.

5. The electronic control device according to claim 2,
wherein the second electronic circuit includes an adjustment circuit that executes the transmissions of different groups on the basis of predefined priorities when the transmissions compete against each other.

6. The electronic control device according to claim 4,
wherein the serial transmission of the pulses is executed in such a way that a plurality of pulses included in the same group are given numbers and the number of a pulse the edge of which has occurred is encoded into a binary number, and the encoded data is transmitted.

7. The electronic control device according to claim 4, wherein the loads are fuel injectors respectively installed for cylinders of an in-vehicle multicylinder engine.

8. The electronic control device according to claim 4, wherein the loads are fuel igniters respectively installed for cylinders of an in-vehicle multicylinder engine.

* * * * *